Feb. 24, 1970

C. M. HIRST 3,497,257

TILT CAB LOCK ACTUATOR

Filed Aug. 7, 1968

INVENTOR
Charles M. Hirst, Jr.

BY *Lawrence [signature]*

ATTORNEY

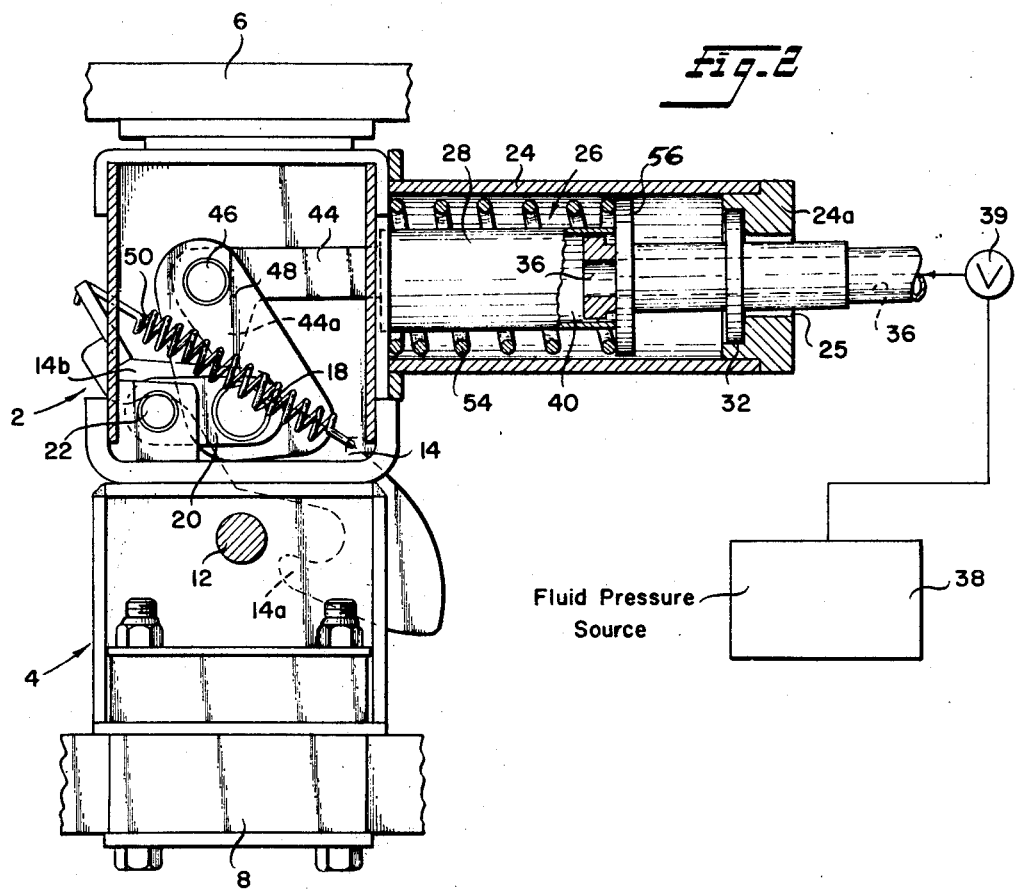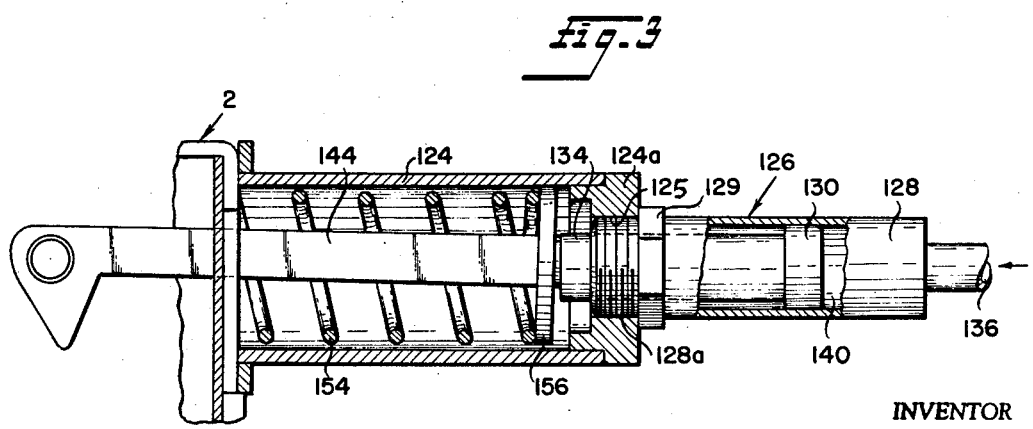

United States Patent Office 3,497,257
Patented Feb. 24, 1970

3,497,257
TILT CAB LOCK ACTUATOR
Charles M. Hirst, Jr., Moberly, Mo., assignor to Orscheln Brake Lever Mfg. Company, Moberly, Mo., a corporation of Missouri
Filed Aug. 7, 1968, Ser. No. 750,863
Int. Cl. B62d 25/00
U.S. Cl. 296—35                     5 Claims

ABSTRACT OF THE DISCLOSURE

Tilt cab lock actuator means including a fluid pressure motor for displacing a hook member between "fully locked," "safety" and "fully released" positions relative to a stationary locking pin. Cam means operable by the motor serve to axially displace the hook member between the fully locked and safety positions, and a protuberance carried on an operating arm portion of one of the piston and cylinder motor components is adapted to engage a corresponding surface on the hook to pivot the same from the safety position to the released position.

---

In my prior U.S. Patent No. 3,279,559, there is disclosed a lever operated cushioning and locking mechanism designed to lock together the tilt-cab and chassis components of a motor vehicle. One object of that invention resides in the provision of an operating handle for simultaneously operating two or more locking devices by a single lever to selectively place the device in locked, safety or fully released conditions.

While the prior lever-operated actuating means proved to be satisfactory in operation, it was found to be desirable in certain instances to provide automatically operable or remotely-controlled means for actuating the lock means between locked, safety and fully released conditions. In order to simplify the design, construction and installation of the actuator means, it was proposed to utilize a linearly-operable fluid pressure motor of the piston and cylinder type, use being made of a conventional source of pressure liquid or gas on the vehicle for operating the motor means.

Accordingly, the primary object of the present invention is to provide actuator means for a tilt cab locking assembly, characterized by the provision of linearly-operable pressure motor means for displacing a conventional hook lock member between fully locked, safety and fully released positions relative to a stationary pin. The motor includes piston and cylinder components one of which is stationary and the other of which is movable, the movable component having attached thereto an axially displaceable operating arm. Upon axial displacement of the arm in the assembly-unlocking direction, a cam member is initially rocked to pivot a supporting link to axially displace the hook member from the locked position to the safety position, and upon further displacement of the arm, a protuberance thereon engages the hook member to pivot the same from the safety to the fully released position.

In accordance with a more specific object of the invention, the piston component of the motor is mounted in fixed relation to the mounting housing, and the cylinder member is axially shiftable relative thereto to actuate the locking means. According to another embodiment, the cylinder component is secured to the housing and the piston constitutes the movable component for operating the lock assembly.

Other objects and advantages of the invention will become apparent from a study of the following specification when viewed in the light of the accompanying drawing, in which:

FIG. 2 is a corresponding sectional view of the lock assembly when in the fully released condition; and FIG. 3 is a detailed view of an alternate embodiment of the actuator means.

Figure 1:
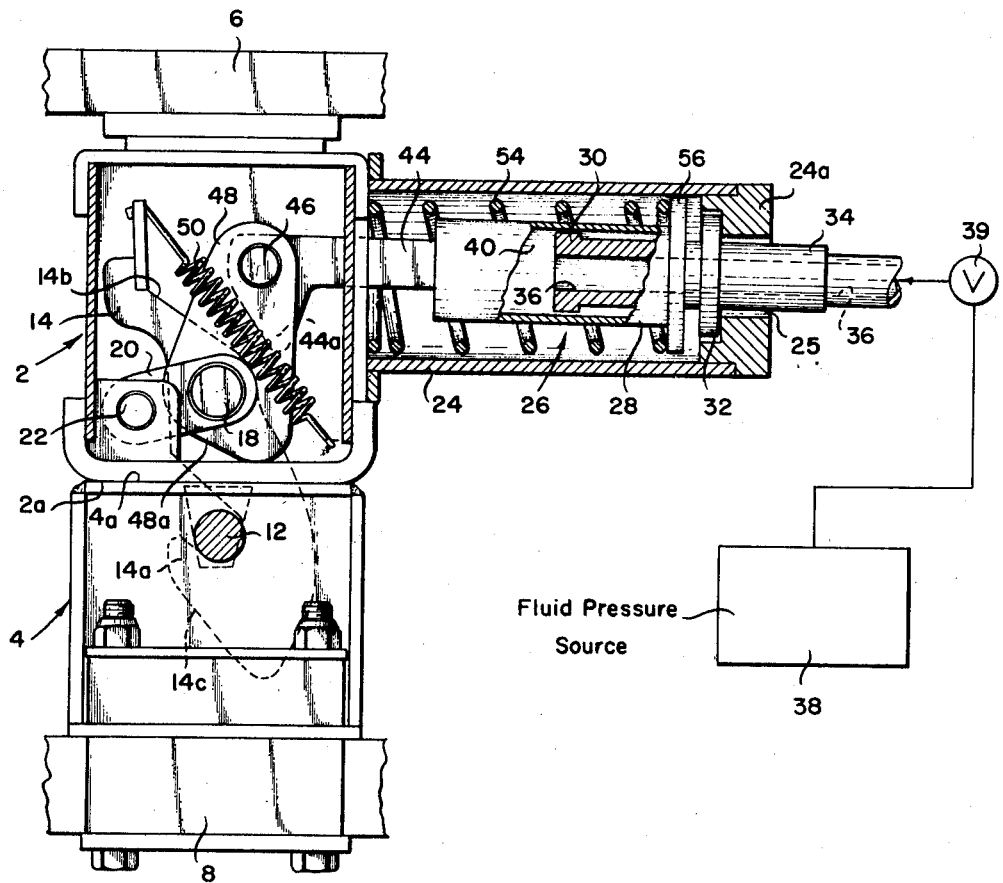
FIG. 1 is a sectional view illustrating the improved tilt cab lock assembly in the locked condition.

Referring to FIG. 1, the tilt cab lock assembly includes a pair of hollow box-shaped metal housings 2 and 4 that are secured to the cab 6 and chassis frame 8, respectively, and include seated horizontal surfaces 2a, 4a in metal to metal contact. Secured between the side walls of lower housing 4 is a transverse pin 12. Movably connected within the upper housing 2 is a hook member 14 the lower portion 14a of which extends through corresponding openings in the horizontal surfaces 2a, 4a and terminates in a hooked configuration adapted for locking engagement with the pin 12. More particularly, the hook member is pivotally connected intermediate its ends by pivot shaft 18 with a link 20 the other end of which is pivotally connected with housing 2 by the fixed pivot 22.

Rigidly secured on the housing 2 is a hollow cylindrical body 24 the free end of which is closed by a transverse wall portion 24a containing a central opening 25. Mounted in the body 24 is a fluid pressure motor 26 including a movable cylinder 28, and a stationary piston 30 having a shoulder portion 32 seated in a corresponding recess contained in end wall 24a. The piston includes also a piston rod 34 that extends through the wall opening 25 and contains a bore 36 through which pressure fluid is supplied from a source 38 via suitable control valve means 39 to the working chamber 40 of the motor 26. Secured at one end to cylinder 28 is an operating arm 44 the other end of which extends through corresponding wall openings into the upper housing 2. Pivotally connected between operating arm 44 and link 20 by pivots 46 and 18 is a cam member 48 which is generally of the shape of a bell crank lever. At its lower end the cam carries a cam surface 48a adapted for engagement with the adjacent surface of the bottom wall of housing 2 to effect pivotal movement of link 20 about pivot 22. Spring 50 connected between housing 2 and the free end of hook member 14 biases the hok member in the clockwise direction about pivot shaft 18 in the closed direction relative to the pin 12. A second spring 54 is arranged concentrically about motor 26 between the housing 2 and a spring retainer cap 56 carried by the cylinder 28, said spring biasing cylinder 28 and arm 44 to the right, whereby cam 48 is biased in the clockwise direction relative to pivot shaft 18, and link 20 is biased in the counterclockwise direction relative to pin 22 to the first position illustrated in FIG. 1.

As will be explained below, operating arm 44 carries at its extremity a protuberance 44a adapted to engage an inclined surface 14b on the hook member, whereby during extension of the motor 26, the hook member is pivoted in the counterclockwise direction about pivot shaft 18 against the biasing force of spring 50.

OPERATION

Assuming that the assembly is in the locked position of FIG. 1 and it is desired to unlock the same to permit tilting movement of the cab relative to the chassis, pressure fluid is supplied to motor chamber 40 to shift cylinder 28 and arm 44 to the left relative to piston 30 against the biasing force of spring 54. Cam 48 is rocked in the counterclockwise direction about its lower end to pivot link 20 in the clockwise direction about pivot 22 to the position shown in FIG. 2, the pivot shaft 18 being lowered to displace hook member 14 downwardly from the FIG. 1 locked position to a safety position in which the hook portion 14a is spaced downwardly from the pin 12. Upon further displacement of cylinder 28 and arm 44 to the left, protuberance 44a engages hook surface 14b to pivot hook 14 in the counterclockwise direction against the restoring force of spring 50, whereupon the hook member is pivoted from the safety position to the fully released position of FIG. 2. The unlocked cab may now be tilted by conventional tilting means (not shown) to separate box members 2 and 4, whereupon reduction of the pressure of the fluid supplied to chamber 40 causes cylinder 28 and arm 44 to be shifted to the right by spring 54. Cam 48 is rocked to the FIG. 1 position to pivot link 20 upwardly to the first position, and hook member 14 is pivoted to the vertical position by spring 50.

To lower the cab to effect seating of housing 2 in metal-to-metal contact with housing 4, motor chamber 40 is again pressurized to pivot hook member 14 to the fully released (FIG. 2) position, and upon lowering of the cab and release of the pressure, the hook member is first pivoted in the clockwise direction by spring 50 to the safety position, and then is displaced vertically upwardly to the locked position by upward pivotal movement of link 20.

In accordance with an alternate embodiment of the invention, the positions of the cylinder and piston components of the motor are reversed so that the cylinder is stationary and the piston is movable relative to the housing. More particularly, the cylinder 128 includes a threaded portion 128a mounted in a correspondingly threaded bore 125 contained in the end wall 124a of the cylindrical body 124 secured to housing 2. Lock nut 129 prevents rotation of the cylinder 128 relative to the body 124. Piston rod 134 extends at its free end into the tubular body 124 in engagement with the actuator arm 144 that is normally biased to the right by spring 154 arranged between retainer cap 156 and the wall of housing 2. At its free end the operating arm 144 is pivotally connected with the cam 48 as in the embodiment of FIG. 1, the protuberance on the arm being arranged to pivot the hook member from the safety position to the fully released position.

While in accordance with the provisions of the Patent Statutes the preferred and alternate embodiments have been illustrated and described, it will be apparent to those skilled in the art that various improvements and modifications may be made without deviating from the invention set forth in the following claims.

What is claimed is:

1. In a tilt cab lock assembly for locking together a pair of contiguous housings a first one of which includes a fixed transverse pin, said assembly including a hook member having at one end a hook portion adapted for engagement with said pin, and a link pivotally connected at one end with the second one of said housings and at the other end with a portion of said hook member intermediate its ends, said link being pivotable between a first position in which said hook member is in a locked position in engagement with said pin, and a second position in which the hook member is axially displaced to a safety position out of engagement with the pin; the improvement which comprises:

actuator means including fluid pressure motor means for initially pivoting said link from said first position to said second position, and for subsequently pivoting said hook member from said safety position to a fully released position relative to said pin, said motor means including piston and cylinder members one of which is rigidly secured to said second housing, said actuator means including also an operating arm connected a tone end with the other of said motor members, and bell crank cam means connecting the other end of said operating arm with said other end of said link.

2. Apparatus as defined in claim 1, and further including first spring means biasing said hook member in the direction from said released position toward said safety position, and second spring means biasing said other motor member in the direction effecting displacement of said link from said second position toward said first position.

3. Apparatus as defined in claim 2, and further wherein said other end of said operating arm includes an actuating surface arranged for engagement with a corresponding surface on said hook member for pivoting said hook member from the safety position toward the fully released position.

4. Apparatus as defined in claim 1, wherein said one motor member is the cylinder member.

5. Apparatus as defined in claim 1, wherein said one motor member is the piston member.

References Cited
UNITED STATES PATENTS 1,983,280   12/1934   Flowers.
3,113,352   12/1963   Gibbs et al. _____ 292—201

BENJAMIN HERSH, Primary Examiner
JOHN A. PEKAR, Assistant Examiner

U.S. Cl. X.R.
105—366

UNITED STATES PATENT OFFICE
CERTIFICATE OF CORRECTION

Patent No. 3,497,257      Dated February 24, 1970

Inventor(s) CHARLES M. HIRST, JR.

It is certified that error appears in the above-identified patent and that said Letters Patent are hereby corrected as shown below:

In Claim I, Column 4, line 18 reads

"connected a tone" should read,

-- connected at one --

SIGNED AND SEALED

AUG 25 1970

(SEAL)
Attest:

Edward M. Fletcher, Jr.
Attesting Officer

WILLIAM E. SCHUYLER, JR.
Commissioner of Patents